US008255802B2

(12) United States Patent
Streater

(10) Patent No.: US 8,255,802 B2
(45) Date of Patent: Aug. 28, 2012

(54) METHOD FOR ENABLING EFFICIENT NAVIGATION OF VIDEO

(75) Inventor: Stephen Bernard Streater, London (GB)

(73) Assignee: Forbidden Technologies PLC, London (GB)

( * ) Notice: Subject to any disclaimer, the term of this patent is extended or adjusted under 35 U.S.C. 154(b) by 377 days.

(21) Appl. No.: 11/578,946

(22) PCT Filed: Apr. 14, 2005

(86) PCT No.: PCT/GB2005/001444
§ 371 (c)(1),
(2), (4) Date: Dec. 11, 2006

(87) PCT Pub. No.: WO2005/101408
PCT Pub. Date: Oct. 27, 2005

(65) Prior Publication Data
US 2008/0126997 A1      May 29, 2008

(30) Foreign Application Priority Data

Apr. 19, 2004   (GB) .................................. 0408677.3

(51) Int. Cl.
*G06F 3/048* (2006.01)
(52) U.S. Cl. ......................... 715/716; 715/856; 715/720

(58) Field of Classification Search .................. 715/716, 715/856, 720
See application file for complete search history.

(56) References Cited

U.S. PATENT DOCUMENTS

| 5,495,566 | A  | * | 2/1996 | Kwatinetz ...................... 715/785 |
| 6,342,902 | B1 | * | 1/2002 | Harradine et al. ............. 715/716 |
| 6,377,713 | B1 | * | 4/2002 | Vuong .......................... 382/299 |
| 6,400,378 | B1 |   | 6/2002 | Snook |

FOREIGN PATENT DOCUMENTS

| DE | 199 44 746 A1 | 3/2000 |
| EP | 1 164 791 A   | 12/2001 |
| WO | WO 97/27704 A | 7/1997 |

OTHER PUBLICATIONS

Super Stock, Rolodex 1566-02602 & 831-205, www.superstock.com.*
Card et al., "Information Visualization Using Vision to Think", 1999, pp. 570-575.*

\* cited by examiner

*Primary Examiner* — Ryan Pitaro
*Assistant Examiner* — Andrea Leggett
(74) *Attorney, Agent, or Firm* — Sughrue Mion, PLLC

(57) ABSTRACT

A method of facilitating navigation of a sequence of source images the method using tokens representing each source image which are scaled versions of each source image and which are arranged adjacently on a display device in a continuous band of token images so that a pointer device can point to a token and the identity of the corresponding image is available for further processing.

18 Claims, 2 Drawing Sheets

METHOD FOR ENABLING EFFICIENT NAVIGATION OF VIDEO

BACKGROUND

Visual recordings of moving things are generally made up of sequences of successive of images. Each such image represents a scene at a different time or range of times. This invention relates to recordings consisting of sequences of images such as are found, for example, in video, film and animation.

The common video standard PAL used in Europe comprises 25 frames per second. This means that an hour of video will consist of nearly 100,000 frames. Other video formats, such as the NTSC standard used in the USA and Japan, have similar number of frames per hour as PAL.

A requirement for a human operator to locate accurately and to access reliably a particular frame from within many can arise. One application where this requirement arises is video editing. In this case, the need may not just be for accurate access on the scale of individual frames, but also easy access to different scenes many frames apart. In other words, there is a need to be able to access video frames over a range of time scales which may be up to five or six orders of magnitude apart.

SUMMARY OF THE INVENTION

The invention described herein is a method for enabling efficient access to video content over a range of temporal scales.

DESCRIPTION OF THE INVENTION

Assume there is a source which contains images making up a video, film, animation or other moving picture. Images in the source are digitised and labelled with frame numbers where later times correspond to bigger frame numbers and consecutive frames have consecutive frame numbers.

Each image is given an associated token image, which may be a copy of the source image. In practice, these source images may be too big to fit many on a display device such as a computer screen at the same time. In this case, the token image will be a reduced size version of the original image. The token images are small enough that a number of token images can be displayed on the display device at the same time. In application according to this invention, this size reduction is achieved by averaging a number of pixels in the source image to give each corresponding pixel in the smaller token images. There are many tools available to achieve this. In this application, there are typically between ten and fifty token images visible at a time.

Figure 1:
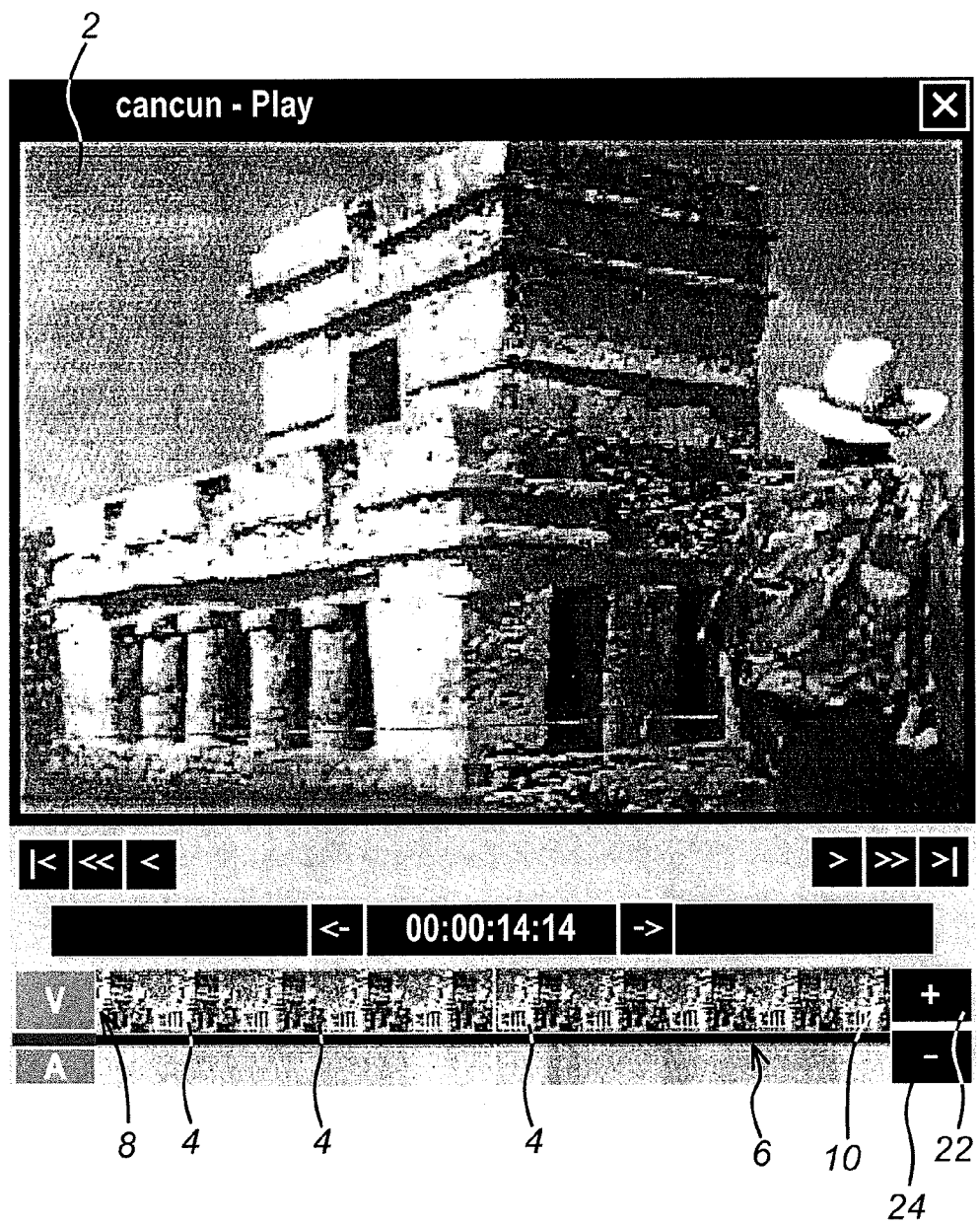
FIG. 1 is a computer display to which the invention may apply.

Referring to FIG. 1, in one embodiment of the invention, there is a computer display whose resolution is 1024×768 pixels, and the images (2) from the source video are digitised at 320×240 pixels, and the tokens (4) representing the source images are 32×24 pixels. In one commercial application of this invention, the token images have the same aspect ratio as the original images.

The token images are then combined consecutively with no gaps between them in a continuous band (6) which is preferably horizontal. This band is then displayed on the computer screen, although if the source is more than a few images in length, the band will be wider than the available display area, and only a subset of it will be visible at any one time.

The video is navigated to frame accuracy by using a pointing device, such as a mouse, which is pointed at a particular token within the horizontal band. This causes the original image corresponding to this token to be selected. Any appropriate action can then be carried out on the selected frame. For example, the selected frame can then be displayed. In another example, the time code of the selected frame can be passed on for further processing. In a further example, the image pixels of the selected frame can be passed on for further processing.

In a further refinement, in one implementation, when the pointing device points near to the edge (8) or (10) of the displayed subset of the horizontal band, the band automatically and smoothly scrolls so that the token originally being pointed to moves towards the centre of the displayed range. This allows access beyond the original displayed area of the horizontal band.

Figure 2:
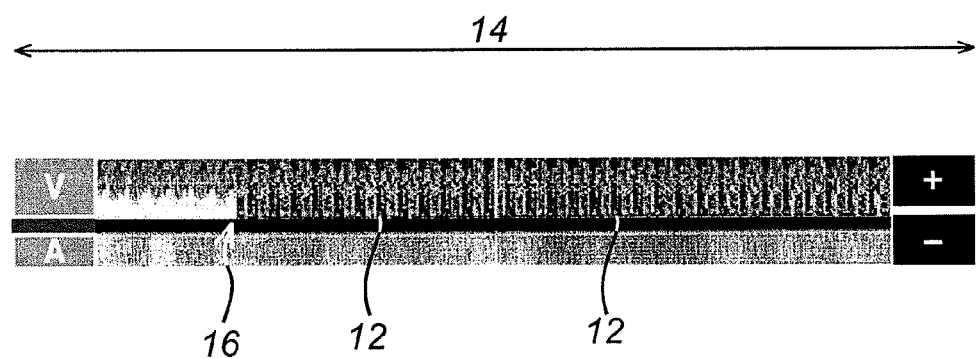
FIG. 2 is a sequence of source image frames to which the invention may apply.

The above description therefore shows how frame accurate access is simple for short clips. The same principle can be extended to longer sequences of source image frames, as illustrated in FIG. 2.

Each token is reduced in size, but this time only horizontally. This reduction leaves each new token (12) at least one pixel wide. Where the reduction in size is by a factor of x, the resulting token is called an x-token within this document. So, for example, 2-tokens are half the width of tokens, but the same height. The x-tokens are then displayed adjacent to each other in the same order as the original image frames to create a horizontal band as with the tokens, but with the difference that more of these x-tokens fit in the same space than the corresponding tokens, by a factor of x.

Navigation proceeds as before, the difference being that each x-token is narrower than before, so that more of them are visible than with the original tokens, and a smaller pointer movement is needed to achieve the same movement in frames.

In one such implementation, the space (14) allocated to the horizontal band for tokens and x-tokens is 320 pixels. The tokens (4) are 32×24 pixels, and the x-tokens (12) are created in a variety of sizes down to 1×24 pixels. In the 32-token case, the horizontal band corresponds to 320 frames of video, compared with ten frames for the token image. This range of 320 frames can be navigated successfully with the pointer.

This design is a significant departure from existing commercial systems where instead of a horizontal band made of all the x-tokens, the corresponding band may contain one token in every x. In this invention, subject to the colour resolution of the display device, every pixel in every image contributes some information to each horizontal band. Even with x-tokens only one pixel wide, the position of any cut (16) on the source is visible to frame accuracy, as are sudden changes in the video content.

Figure 3:
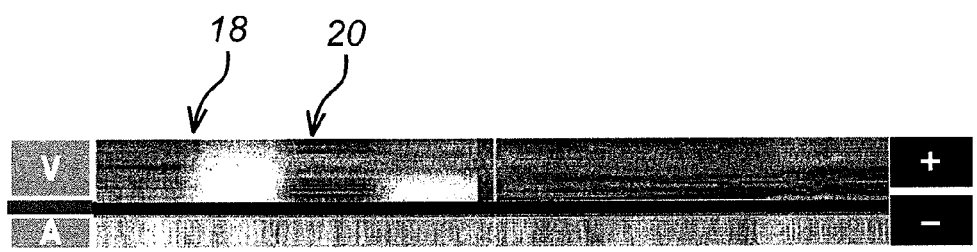
FIG. 3 is an example of additional horizontal reductions.

The x-tokens are fine for navigating short clips, but to navigate longer sources, further horizontal reductions are required, see FIG. 3. In the case where each horizontal pixel on the horizontal display band represents y frames, the horizontal band made of 1 pixel wide x-tokens is squashed horizontally by a factor of y. If y is an integer, this is achieved by combining y adjacent non-intersecting sets of 1 pixel wide x-tokens (by for example averaging) to make a y-token one pixel wide and the same height as the tokens.

Significant changes of video content (18, 20) can still be identified, even for quite large values of y.

In one implementation, values of x and y used are powers of two, and the resulting horizontal display bands represent all scales from 10 frames to 5120 frames. Larger values of y will be appropriate for longer videos.

In the x-tokens and y-tokens, the values of x and y need not be integers, although appropriate weightings between vertical lines within image frames and between image to frames will then be needed if image artefacts are to be avoided.

In one implementation, the tokens, x-tokens and y-tokens are created in advance of their use for editing in order to facilitate rapid access to the horizontal bands. The x-tokens and y-tokens are created at multiple resolutions. Switching between horizontal bands representing different scales is facilitated by zoom in and zoom out buttons (22, 24) which move through the range of horizontal contractions available.

The invention claimed is:

1. A method of facilitating navigation of a sequence of source images, via a display device and under computer control, the method comprising:
   generating a plurality of token images, each being a digitized representation of a scaled down version of a respective source image, by transforming said source images into token images for display on said display device;
   creating an arrangement of said token images on the display device in a continuous band of token images arranged adjacently; and
   responding to a computer controlled pointer device pointing to a token image on the display device by identifying the corresponding image for further processing,
   the method further comprising,
   transforming the continuous band of token images, each token image having a multi pixel width and a multi-pixel height into at least one new squashed band by squashing the token images in a continuous band of token images in the longitudinal direction only, by one or more factors using pixel averaging, to create said at least one new squashed band of squashed token images, whereby each individual squashed token image can be reduced to a maximum of a single pixel width and a multi-pixel height.

2. A method according to claim 1,
   wherein, in each case squashing is by a factor which is no greater than the pixel width of the individual token images making up the band.

3. A method according to claim 1 further comprising, transforming neighbouring squashed token images by combining said neighbouring squashed token images to make new squashed token images corresponding to multiple frames and arranging these new squashed token images next to each other in a band.

4. A method according to claim 3 wherein said source images comprise a matrix of a first plurality of pixels and said token images comprise a matrix of a second plurality of pixels and said new squashed token images comprise a third plurality of pixels, where said second plurality is less than said first plurality and said third plurality is less than said second plurality.

5. A method according to claim 4 wherein said third plurality of pixels are reduced in size only in one matrix direction.

6. A method according to claim 4 wherein said third plurality of pixels are one pixel in size only in one matrix direction.

7. A method according to claim 1 wherein the widths and heights of different tokens differ.

8. A method according to claim 1 further comprising,
   generating a normal video display from the source images and displaying the normal video display together with the band arranged horizontally on the display device.

9. A method according to claim 1 further comprising, automatically scrolling the band, which is so arranged that, when the pointer device points to a token near to an edge of a displayed subset of the continuous band, the band automatically scrolls, so that the token moves towards the centre of a displayed range thereby, allowing access to a region beyond an original displayed area.

10. A method according to claim 1 wherein said source images comprise a matrix of a first plurality of pixels and said token images initially comprise a matrix of a second plurality of pixels, where said second plurality is less than said first plurality.

11. A method according to claim 1, in which squashing is by a total factor (x·y) which is greater than the pixel width x of the individual token images, by first squashing the tokens by a factor x which is equal to the pixel width to produce a band of 1-pixel wide x-tokens, and then combining each set of y adjacent 1-pixel wide x-tokens, to produce a y-token which is 1-pixel wide.

12. A method of facilitating navigation of a sequence of source images, via a display device and under computer control, the method comprising:
    generating a plurality of token images, each being a digitized representation of a scaled down version of a respective source image, by transforming said source images into token images for display on said display device;
    creating an arrangement of said token images on the display device in a continuous band of token images arranged adjacently; and
    responding to a computer controlled pointer device pointing to a token image on the display device by identifying the corresponding image for further processing,
    the method further comprising,
    transforming the continuous band of token images, each token image having a pixel width that extends in a horizontal direction and a pixel height that extends in a vertical direction, into at least one new squashed band by squashing the token images in the continuous band of token images in the horizontal direction only, by one or more factors, to create said at least one new squashed band of squashed token images, whereby each individual squashed token image can be reduced to a minimum of a single pixel width and a multi-pixel height.

13. A method according to claim 12,
    wherein squashing is by averaging a number of pixels in the pixel width of the individual token images making up the band.

14. The method according to claim 12,
    wherein every pixel in every original image contributes some information to each horizontal band.

15. The method according to claim 12, further comprising:
    for said new squashed band of squashed token images, further squashing the band by a further factor by combining adjacent non-intersecting sets of squashed tokens.

16. A method according to claim 12, in which squashing is by a total factor (x·y) which is greater than the pixel width x of the individual token images, by first squashing the tokens by a factor x which is equal to the pixel width to produce a band of 1-pixel wide x-tokens, and then combining each set of y adjacent 1-pixel wide x-tokens, to produce a y-token which is 1-pixel wide.

17. A method of facilitating navigation of a sequence of source images, via a display device and under computer control, the method comprising:
   generating a plurality of token images, each being a digitized representation of a scaled down version of a respective source image, by transforming said source images into token images for display on said display device;
   creating an arrangement of said token images on the display device in a continuous band of token images arranged adjacently; and
   responding to a computer controlled pointer device pointing to a token image on the display device by identifying the corresponding image for further processing,
   the method further comprising,
   transforming the continuous band of token images, each token image having a multi pixel width and a multi-pixel height into at least one new squashed band by squashing the token images in the continuous band of token images in the longitudinal direction only, by one or more factors, to create said at least one new squashed band of squashed token images, and
   transforming neighbouring squashed token images by combining said neighbouring squashed token images to make new squashed token images corresponding to multiple frames and arranging these new squashed token images next to each other in a band.

18. A method of facilitating navigation of a sequence of source images, via a display device and under computer control, the method comprising:
   generating a plurality of token images, each being a digitized representation of a scaled down version of a respective source image, by transforming said source images into token images for display on said display device;
   creating an arrangement of said token images on the display device in a continuous band of token images arranged adjacently; and
   responding to a computer controlled pointer device pointing to a token image on the display device by identifying the corresponding image for further processing,
   the method further comprising,
   transforming the continuous band of token images, each token image having a pixel width 'x' that extends in a horizontal direction and a pixel height that extends in a vertical direction, into at least one new squashed band by squashing the token images in the continuous band of token images in the horizontal direction only, by a maximum factor 'x', to create said at least one new squashed band of squashed token images, and
   transforming each group of 'y' adjacent squashed token images by combining said 'y' adjacent squashed token images to make new squashed token images corresponding to multiple frames and arranging these new squashed token images next to each other in a band.

* * * * *